US012735139B2

(12) United States Patent
Ziraldo et al.

(10) Patent No.: US 12,735,139 B2
(45) Date of Patent: Sep. 15, 2026

(54) REAR WHEEL LATCHING MECHANISM

(71) Applicants: Honda Motor Co., Ltd., Tokyo (JP); JD Components Co., Ltd., Taichung City (TW)

(72) Inventors: Nicholas P. Ziraldo, Powell, OH (US); Matthew B. Staal, Torrance, CA (US); Jackie P. Porchay, Torrance, CA (US); Ming Hsein Lee, Taichung (TW); Ding Jong Chou, Taichung (TW); Sheng Yu Huang, Taichung (TW)

(73) Assignees: Honda Motor Co., Ltd., Tokyo (JP); JD Components Co., Ltd., Taichung City (TW)

( * ) Notice: Subject to any disclaimer, the term of this patent is extended or adjusted under 35 U.S.C. 154(b) by 352 days.

(21) Appl. No.: 18/240,850

(22) Filed: Aug. 31, 2023

(65) Prior Publication Data

US 2025/0074536 A1 Mar. 6, 2025

(51) Int. Cl.
*B62K 15/00* (2006.01)

(52) U.S. Cl.
CPC .................................. *B62K 15/006* (2013.01)

(58) Field of Classification Search
CPC .................................................... B62K 15/006
See application file for complete search history.

(56) References Cited

U.S. PATENT DOCUMENTS 2,696,272 A 12/1954 Schlaphoff
6,273,442 B1 8/2001 Fallon et al.
6,523,223 B2 2/2003 Wang
7,967,095 B2 6/2011 Kosco et al.
8,613,458 B2 12/2013 Ghisolfi et al.
9,422,022 B2 8/2016 Sharkan et al.
9,896,148 B2 2/2018 Baba
2015/0246705 A1* 9/2015 Sharkan ............... B62K 15/008 180/208
2020/0216117 A1* 7/2020 Chiu .................... B62K 15/008
2022/0185417 A1* 6/2022 Chiu ...................... B62K 5/003

FOREIGN PATENT DOCUMENTS

CN 2712782 7/2005
CN 201023591 Y 2/2008
CN 201154754 11/2008

(Continued)

*Primary Examiner* — Drew J Brown
(74) *Attorney, Agent, or Firm* — Plumsea Law Group, LLC

(57) ABSTRACT

A rear wheel latching mechanism for a personal transport device and a corresponding personal transport device are provided. The mechanism includes a rear wheel attached to an arm, which includes an inner extrusion that slides on one axis of a fixed frame in a horizontal direction. The fixed frame comprises an outer extrusion that surrounds the inner extrusion. The mechanism also includes a rear wheel cam-latch, configured to lock the inner extrusion and the outer extrusion together. The rear wheel cam-latch allows the rear wheel to articulate when the rear wheel cam-latch is unlatched between a stored state and a deployed state. The mechanism also includes a rear wheel pin that catches and holds the rear wheel in the deployed state to fix a front portion of the inner extrusion and a rear portion of the outer extrusion before the rear wheel cam-latch clamps the inner and outer extrusions together.

20 Claims, 9 Drawing Sheets

(56) References Cited

FOREIGN PATENT DOCUMENTS

| | | | | | |
|---|---|---|---|---|---|
| CN | 201186711 | | | 1/2009 | |
| CN | 201291966 | Y | | 8/2009 | |
| CN | 201291969 | Y | | 8/2009 | |
| CN | 201506429 | U | | 6/2010 | |
| CN | 201842193 | U | | 5/2011 | |
| CN | 203372336 | U | | 1/2014 | |
| CN | 105000113 | B | | 10/2015 | |
| CN | 204871405 | U | | 12/2015 | |
| CN | 105460138 | B | | 4/2016 | |
| CN | 105480348 | A | * | 4/2016 | ........... B62K 15/006 |
| CN | 205168762 | U | | 4/2016 | |
| CN | 102152831 | B | | 5/2016 | |
| CN | 106005187 | A | | 10/2016 | |
| CN | 103770876 | B | | 11/2016 | |
| CN | 108407959 | A | * | 8/2018 | ........... B62K 15/006 |
| CN | 108657349 | A | | 10/2018 | |
| CN | 108674553 | A | | 10/2018 | |
| CN | 112644622 | A | * | 4/2021 | ........... B62K 15/006 |
| CN | 117980215 | A | * | 5/2024 | |
| CN | 221367316 | U | * | 7/2024 | ............... B62K 7/04 |
| CN | 118894180 | A | * | 11/2024 | ............... B62K 3/00 |
| DE | 3112768 | | | 10/1982 | |
| DE | 10025923 | A1 | | 11/2001 | |
| FR | 2955827 | A1 | * | 8/2011 | ............. B62K 3/002 |
| WO | 2010094824 | A1 | | 8/2010 | |
| WO | 2012152069 | A1 | | 11/2012 | |

* cited by examiner 100
132
222
204
310
214
170
116
216
202
206
210
208

202
438
432
208
424
416
428
426
430
210
420
414
418
412
206
422

202
438
420
430
416
428
426
432
414
412
422
250

REAR WHEEL LATCHING MECHANISM

BACKGROUND

This disclosure relates generally to vehicles, and in particular to a rear wheel latching mechanism for a compact personal transport device. The rear wheel latching mechanism includes a specific latching mechanism that facilitates a transition for a rear wheel between a deployed state and a stored state.

With rising prices of gasoline and automobiles, many people may turn to other more cost efficient modes of transportation such as, for example, mopeds, bicycles, scooters and, more recently, compact personal transport devices, such as electric scooters. These personal transport devices may be particularly popular for use in shorter trips in a city environment due to their compact size, ease of use, mobility, and the fact that they may be folded as needed for ease of portability. They may also be useful for covering the first mile or last mile of a trip that is the link between a user's origin or destination and another transportation means, hub or mass transit network. One existing barrier to widespread use of such compact personal transport devices is the difficulty in transitioning a rear wheel between a deployed state and a stored state before and after their use.

Accordingly, there is a need in the art for an improved compact personal transport device that allows a rear wheel to transition between a deployed state and a stored state quickly and reliably.

SUMMARY

In one aspect, a rear wheel latching mechanism for a personal transport device includes a rear wheel attached to an arm, the arm including an inner extrusion that slides on one axis of a fixed frame of the personal transport device in a horizontal direction. The fixed frame includes an outer extrusion that surrounds the inner extrusion. The mechanism further includes a rear wheel cam-latch, configured to lock the inner extrusion and the outer extrusion together. The rear wheel cam-latch allows the rear wheel to articulate when the rear wheel cam-latch is unlatched between a stored state and a deployed state; The mechanism further includes a rear wheel pin that catches and holds the rear wheel in the deployed state to fix a front portion of the inner extrusion and a rear portion of the outer extrusion before the rear wheel cam-latch clamps the inner and outer extrusions together.

In another aspect, a personal transport device includes a fixed frame, including a horizontal lower portion and an angled upper portion. The horizontal lower portion is attached to a bottom end of the angled upper portion. The personal transport device further includes a rear wheel attached to an arm that slides along the horizontal lower portion of the fixed frame of the personal transport device. The personal transport device further includes a rear wheel cam-latch, configured to lock the arm in place to the horizontal lower portion of the fixed frame of the personal transport device. The rear wheel cam-latch allows the rear wheel to articulate when unlatched between a stored state and a deployed state. The personal transport device further includes a rear wheel pin that holds the rear wheel in the deployed state to fix a front part of the arm and a rear part of the horizontal lower portion of the fixed frame before the rear wheel cam-latch clamps the arm in place.

In another aspect, a personal transport device includes a fixed frame, including a horizontal lower portion and an angled upper portion. The personal transport device further includes a rear wheel attached to an arm including an inner tube that slides along the horizontal lower portion of the fixed frame of the personal transport device. The inner tube is surrounded by an outer tube integrated into the fixed frame. The personal transport device further includes a rear wheel cam-latch, configured to lock the inner tube and the outer tube together. The rear wheel cam-latch allows the rear wheel to articulate when unlatched between a stored state and a deployed state. The personal transport device further includes a rear wheel pin that holds the rear wheel in the deployed state to fix a front portion of the outer tube and a rear portion of the outer tube before the rear wheel cam-latch clamps the inner tube and the outer tube together.

Other systems, methods, features, and advantages of the disclosure will be, or will become, apparent to one of ordinary skill in the art upon examination of the following figures and detailed description. It is intended that all such additional systems, methods, features and advantages be included within this description and this summary, be within the scope of the disclosure, and be protected by the following claims.

BRIEF DESCRIPTION OF THE DRAWINGS

The disclosure may be better understood with reference to the following drawings and description. The components in the figures are not necessarily to scale, emphasis instead being placed upon illustrating the principles of the disclosure. Moreover, in the figures, like reference numerals designate corresponding parts throughout the different views.

DETAILED DESCRIPTION

Figure 1:
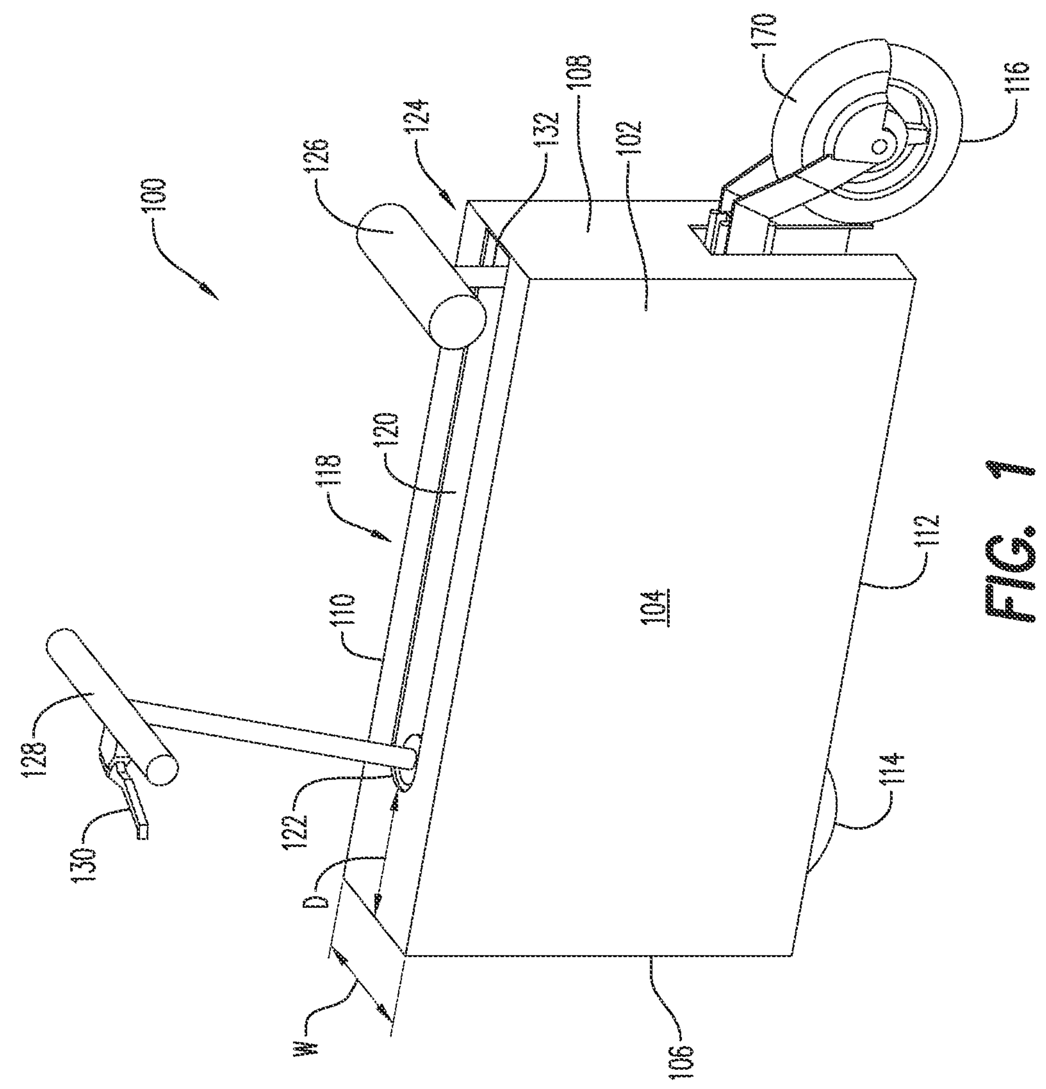
FIG. 1 is a side view of an example embodiment of a compact personal transport device in the form of an electric scooter in a deployed state in accordance with aspects of the present disclosure.

Embodiments of a compact personal transport device with a rear wheel latching mechanism are provided. Such a rear wheel latching mechanism provides for an effective transition between the rear wheel being extended and deployed and the rear wheel being retracted and stored. Such a latching mechanism causes the rear wheel and an associated arm to lock firmly in place when fully extended and deployed or fully retracted and stored. The rear wheel latching mechanism of the compact personal transport locks the rear wheel in these states using a cam-latch mechanism and a pin. The compact personal transport device has a fixed frame. The fixed frame includes a lower middle part that supports the rear wheel. The rear wheel includes an arm that slides on one axis of the fixed frame in the horizontal direction. For example, the lower middle part of the fixed frame allows the arm to slide back and forth. The rear wheel slides along with the attached arm.

While embodiments are referred to as “compact” personal transport devices, it is to be noted that the principles discussed herein apply to personal transport devices in general. Furthermore, various examples are presented with specific references to a scooter, which may be an electric scooter. These examples are of particular relevance to the disclosure presented herein, in that the rear wheel latching mechanism may be particularly relevant for a compact personal transport device taking the form of an electric scooter. Such an electric scooter may be particularly adapted to having a rear wheel slide back and forth in conjunction with a rear wheel latching mechanism, as discussed further below.

There is a cam-latch mechanism that locks inner and outer extrusions together, while a cam is engaged. For example, there may be an outer extrusion that corresponds to an outer tube, and an inner extrusion that corresponds to an inner tube. The outer tube and the inner tube may correspond to an outer extrusion and an inner extrusion in that extrusion techniques may be used when forming these elements as portions of the compact personal transport device. The cam-latch mechanism allows the arm to slide back and forth when a cam lever releases the cam portion of the cam-latch mechanism. The cam-latch mechanism is fixed on the main body of the frame. Specifically, the cam-latch mechanism itself is situated the bottom side of the frame. The cam-latch mechanism allows the rear wheel and the associated arm to articulate back and forth when unlatched. While the cam-latch mechanism is located on the bottom side of the frame, it is integrated with an extrusion clamp block situated on a top side of the frame, as discussed further below.

Additionally, a pin located at the rear of the compact personal transport device catches and holds the rear wheel when in the deployed and extended state. The pin holds a front portion of the inner extrusion and a rear portion of the outer extrusion together before the cam mechanism clamps the inner and outer extrusion together. The pin may be spring loaded, and there may be a pin handle that is lifted to release the pin. To store and retract the rear wheel, the cam lever on the outside of the body of the compact personal transport device is rotated to release the cam and the pin handle is lifted to release the pin. Then, the rear wheel can articulate forward into the body of the compact personal transport device for storage.

The cam-latch mechanism may be integrated with a sliding mechanism that allows the rear wheel to transition easily and conveniently between extended and retracted states. When the rear wheel is fully extended or fully retracted, the cam-latch mechanism and the associated cam ensure that the rear wheel remains secure until the user deliberately unlatches the rear wheel. Thus, if the user is riding on the compact personal transport device, the rear wheel may be securely latched in an extended and deployed state and will remain safely in such a state as the user rides on the compact personal transport device.

Likewise, if the rear wheel is in a fully retracted and stored state, it will also remain securely latched in place. The user may carry the compact personal transport device around without any need for concern that the rear wheel will suddenly slide out or otherwise come loose or unlocked. Thus, embodiments include a rear wheel latching mechanism including a cam-latch mechanism that locks inner and outer extrusions together to hold the rear wheel in a stored state or a deployed state. The cam-latch mechanism allows the rear wheel and its associated arm to articulate when unlatched. The rear wheel latching mechanism also includes a releasable rear wheel pin, which catches and holds the rear wheel in its state before the cam mechanisms clamps the inner and outer extrusions together.

For example, the rear wheel may be attached to a rear wheel arm that is attached to a sliding mechanism movable inside the vehicle frame. The sliding mechanism may be an inner extrusion that slides back and forth within an outer extrusion. As the inner extrusion moves toward the front of the vehicle, the sliding mechanism retracts, simultaneously, the rear wheel and its associated arm into the vehicle frame. When the rear wheel is fully retracted, the cam-latch mechanism and the pin may lock the rear wheel inside the vehicle frame.

By locking the rear wheel in this manner, the rear wheel remains securely inside the vehicle frame. Likewise, when the rear wheel is fully extended, the cam-latch mechanism and the pin may lock the rear wheel in an extended state. By locking the rear wheel in the extended and deployed state, the rear wheel may facilitate the operation of the compact personal transport device while remaining fully anchored and locked in place. As discussed further below, embodiments may also use a Hall sensor to help determine when the rear wheel and the associated arm are fully extended or fully retracted.

The techniques described in connection with the present embodiments may be used to provide a compact personal transport device having a convenient rear wheel latching mechanism. Such a rear wheel latching mechanism allows a user to reliably use the compact personal transport device while the rear wheel is in the extended and deployed state. The rear wheel latching mechanism also allows a user to quickly retract the rear wheel to transform the compact personal transport device into the retracted and stored state.

In the stored state, the compact personal transport device has a compact form factor that allows a user to carry it in a primary vehicle, on public transportation, and/or on other forms of transportation to be used for “last-mile” or “first-mile” trips to and from a destination. As described, in the folded or retracted configuration, a rear wheel of the compact personal transport device may be slid into and stowed securely in the interior of the compact personal transport device. Thus, the rear wheel has an allocated destination within the body of the scooter that keeps the rear wheel safe and secured and also avoids having the rear wheel protrude awkwardly when retracted.

The example embodiments are described herein with reference to a compact personal transport device in the form of an electric scooter. As used herein, an electric scooter is a term used mainly to describe a scooter that is electrically powered, such as by an electric motor powered by a battery. For example, such an electric scooter is a type of personal transport device that is gaining in ridership and usage in many locations. The principles of the example embodiments described herein may principally be applied to electric scooters, but may be applied to scooters with other energy sources and manual scooters. The principles of the examples may apply to other types of personal transport devices, such as bicycles, unicycles, mopeds, skateboards, kickboards, wheelchairs, personal transporters, or the like, to the extent that they are relevant. As noted above, some of the principles may be particularly relevant to personal transport devices that are compact personal transport devices, but the principles presented herein are relevant to personal transport devices in general.

In the example embodiments described herein, the electric scooter has an outer casing having a generally rectangular shape, including two flat sides having a length that is longer than a height. For example, the outer casing may actually have a rectangular shape, or it may have a generally rectangular shape with rounded corners. In addition, the electric scooter of the present embodiments has a width that is substantially smaller than the length and/or height of the electric scooter. In the example embodiments, the electric scooter may be transitioned between an unfolded configuration and a folded configuration.

In the unfolded configuration, components of the electric scooter are in positions extending from outside of the rectangular outer casing so that the electric scooter may be operated or ridden by a user. In the folded configuration, components of the electric scooter are folded or stowed inside the outer casing. It is also possible to provide embodiments in which portions of the electric scooter are not covered by an outer casing, but an outer casing is helpful when carrying the electric scooter in a stored state.

Referring now to FIG. 1, an example embodiment of a personal transport device 100, (e.g., in the form of an electric scooter 100) is shown. In some embodiments, electric scooter 100 may be transitioned or converted between a retracted and stored state and an extended and deployed state. In the retracted state, components of electric scooter 100 are stored or disposed inside an outer casing 102. By having the components of electric scooter 100 be contained in the outer casing 102, they are less obtrusive when trying to carry the electric scooter 100 when it is not being used. In particular, when in the stored state, a rear wheel 116 may be contained in the interior of outer casing 102. However, when in the stored configuration, the rear wheel 116 may extend slightly below the outer casing 102. Such a change of configuration for the rear wheel 116 may be suitable when shifting between carrying and actually riding on the electric scooter 100.

In the deployed state, the rear wheel 116 of electric scooter 100 is slid or extended from its stored state to an extended state outside of outer casing 102 so that a user may operate or ride electric scooter 100. Being in the deployed state implies that the electric scooter 100 is in a riding configuration for use as a vehicle. In such a configuration, the rear wheel 116 is in a state ready for use. Moreover, the steering assembly 128 is aligned vertically and ready for use, in that the handlebars 130 are extended for use in steering.

Figure 2:
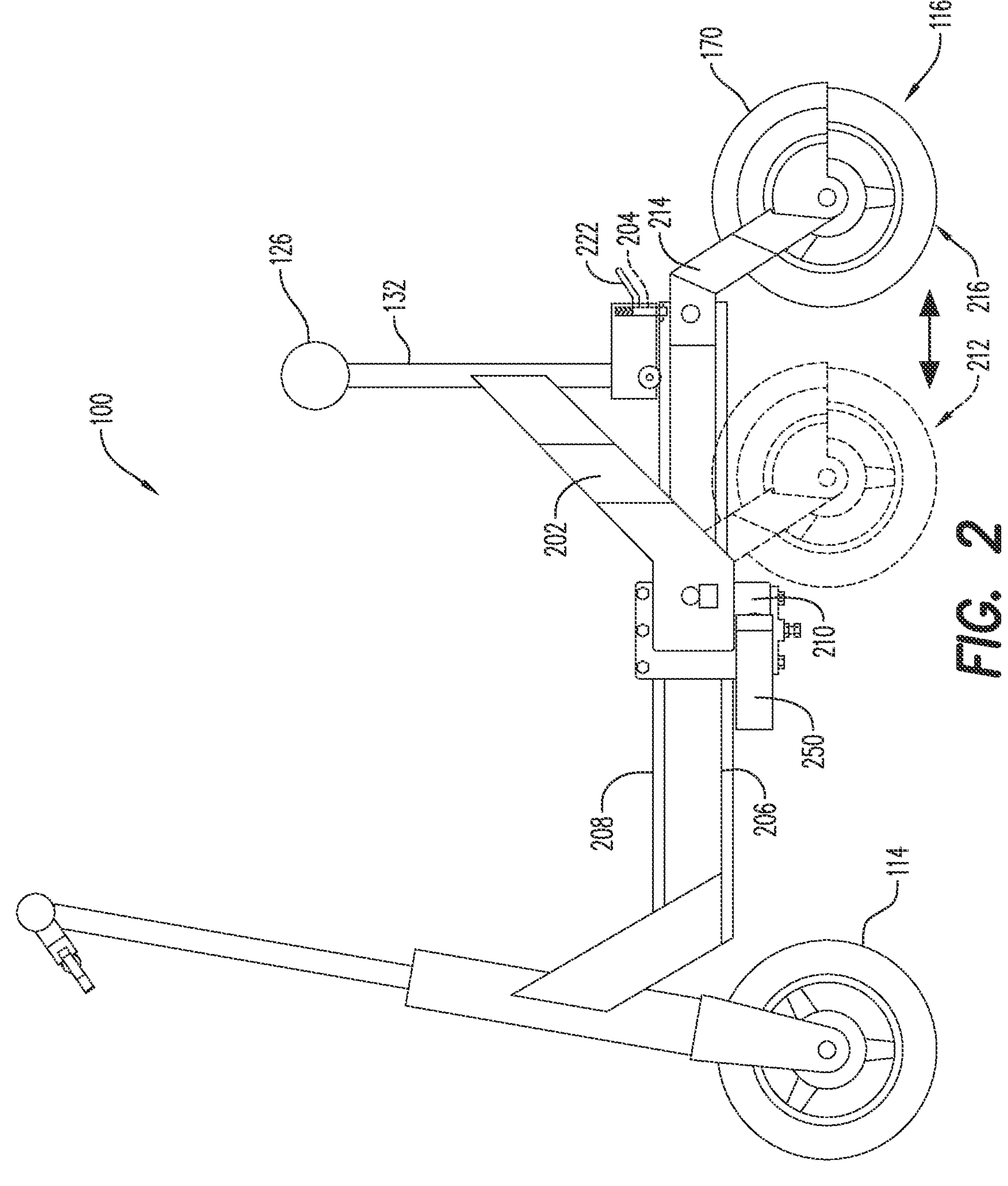
FIG. 2 is a side view showing a range of motion of a rear wheel of the compact personal transport device of FIG. 1, between a stored state and a deployed state, in accordance with aspects of the present disclosure.
Figure 3A:
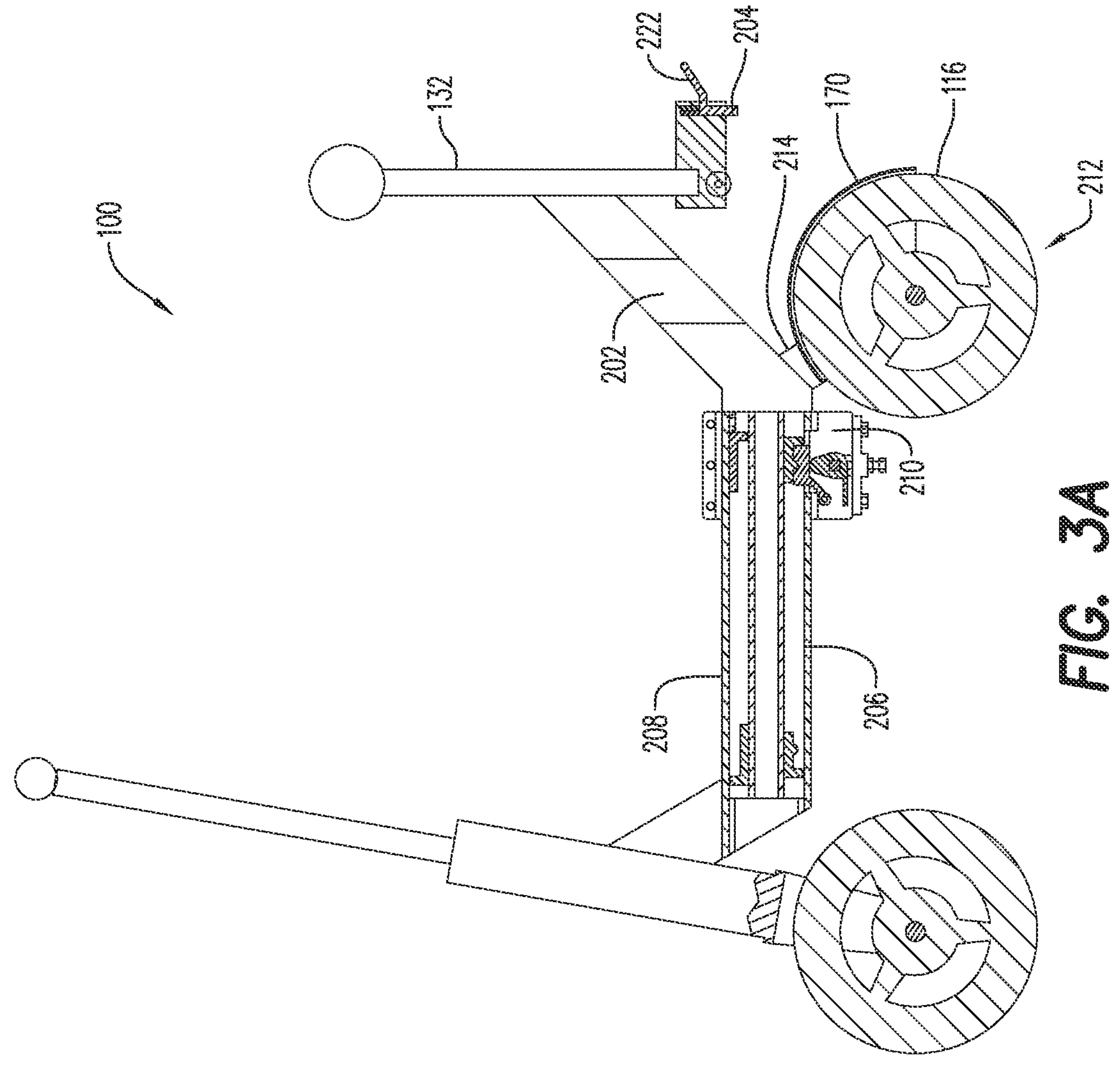
FIG. 3A is a side view showing internal components of the compact personal transport device of FIG. 1, in a configuration with a stored and locked rear wheel, in accordance with aspects of the present disclosure.
Figure 3B:
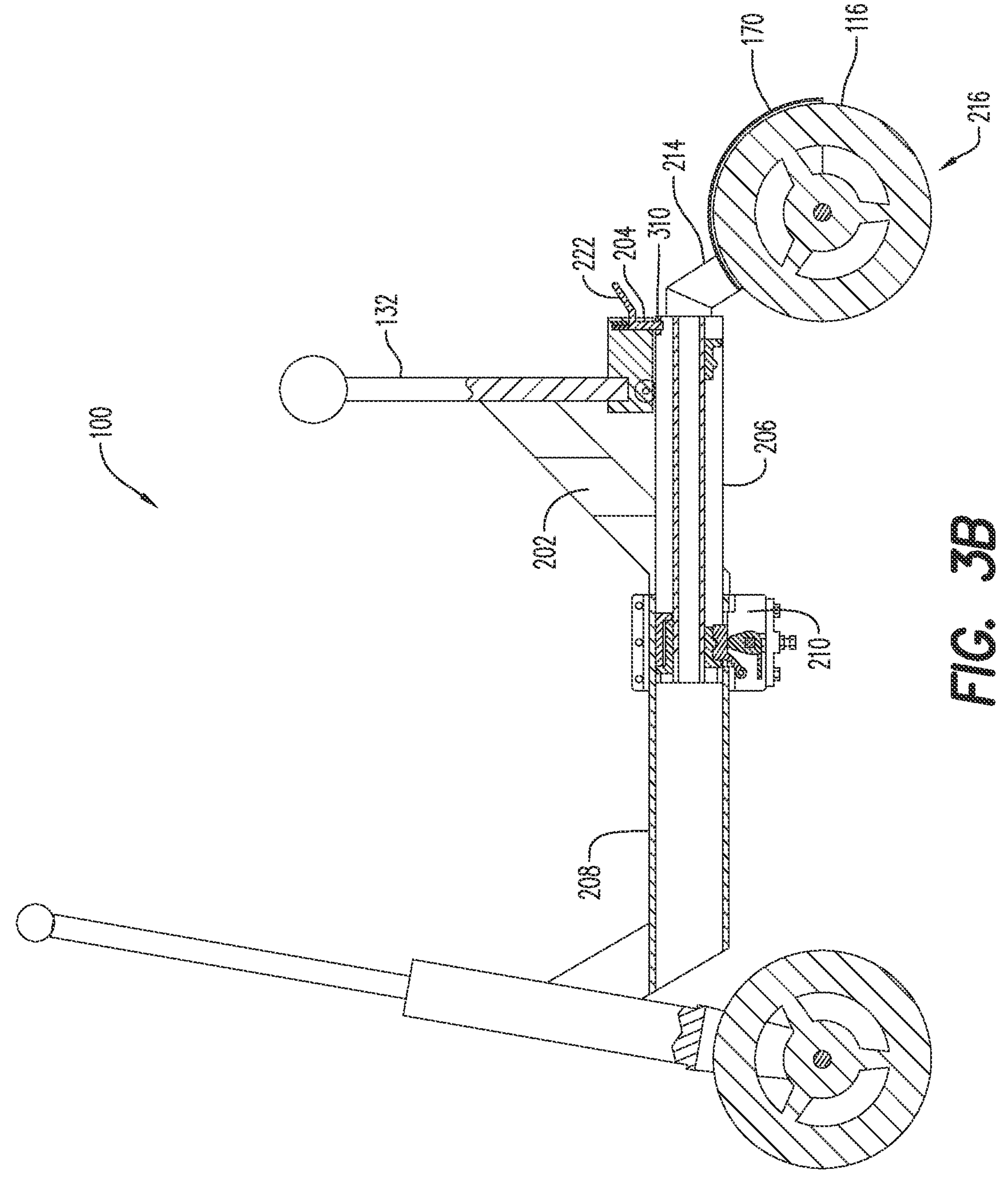
FIG. 3B is a side view showing internal components of the compact personal transport device of FIG. 1, in a configuration with a deployed and locked rear wheel, in accordance with aspects of the present disclosure.

As shown in FIG. 1, electric scooter 100 is in the extended or deployed state. FIG. 2 and FIGS. 3A-3B, described in greater detail below, show aspects of electric scooter 100 in a stored state and in a deployed state. In these configurations, the rear wheel 116 transitions between being retracted and extended from the main body of the electric scooter 100. For example, FIG. 2 shows that the rear wheel 116 may be in an extended state 216 when the electric scooter 100 is in use. FIG. 2 also shows that rear wheel 116 may be stowed into a stowed state 212 when the electric scooter 100 is not in use. Such a transition occurs by the movement of an inner extrusion or inner tube 206, which includes an arm 214 supporting the rear wheel 116, into and out of an outer extrusion or outer tube 208.

Figure 6:
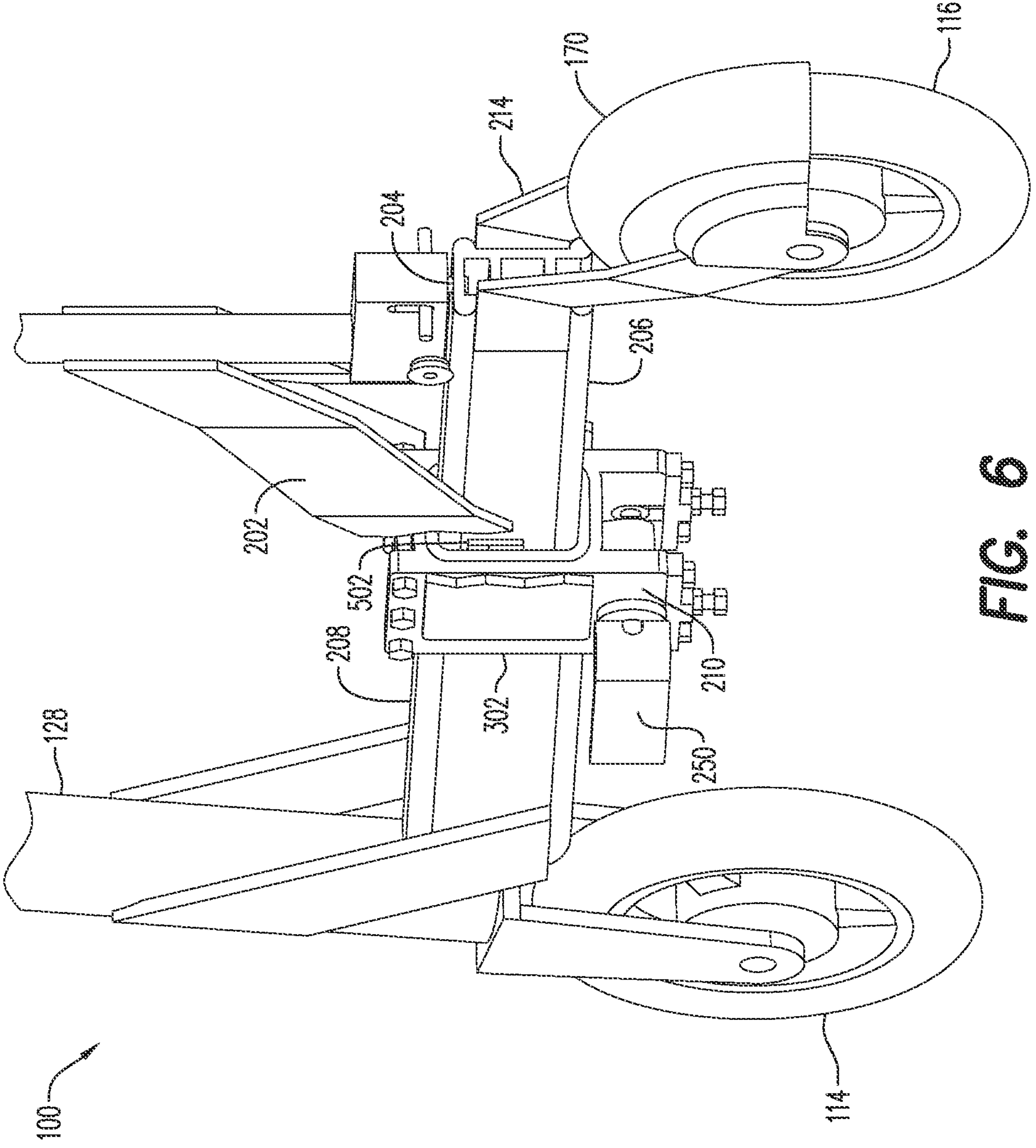
FIG. 6 is an angled side view showing three-dimensional aspects of the compact personal transport device of FIG. 1, in a configuration with a deployed rear wheel, in accordance with aspects of the present disclosure.

Likewise, FIG. 3A illustrates additional aspects of how the electric scooter 100 is configured in a retracted state. FIG. 3A contrasts with FIG. 3B, in which the electric scooter 100 is configured in an extended state. FIG. 6, described in detail below, shows electric scooter 100 in the fully extended configuration, from a different perspective. While this disclosure focuses on changes in state of the rear wheel 116 and the associated inner tube 206, the steering assembly 128 may also be folded into the outer casing. In the fully folded configuration, the steering assembly 128 may be collapsed and folded in a manner that allows it to fold into outer casing 102, along with the exposed seat pole 132 and rear wheel 116. Such folding allows the electric scooter 100 to be carried easily when not being ridden. For example, the electric scooter 100 may be carried using a handle (not shown).

In the embodiment shown in FIG. 1, outer casing 102 of electric scooter 100 includes a first side surface 104 (shown in FIG. 1) and an opposite second side surface (not shown). Outer casing 102 has a width (W) between first side surface 104 and the opposite second side surface that defines a thickness of electric scooter 100. In an example embodiment, side surfaces of outer casing 102 are substantially flat, including each of first side surface 104 and the opposite second side surface.

Outer casing 102 of the electric scooter 100 extends between a front edge 106 of the electric scooter 100 and an opposite rear edge 108 of the electric scooter 100. Outer casing 102 of the electric scooter 100 also extends between a top edge 110 of the electric scooter 100 and an opposite bottom edge 112 of the electric scooter 100. Front edge 106, rear edge 108, top edge 110, and bottom edge 112 define an outer perimeter of rectangular-shaped outer casing 102 of electric scooter 100. In some embodiments these edges include curved corners or are otherwise angled or rounded.

In the embodiment shown in FIG. 1, a front wheel 114 is visible along bottom edge 112 of electric scooter 100 near front edge 106. Electric scooter 100 also includes a rear wheel 116 that is shown as being extended outside of outer casing 102 (i.e., in the unfolded or riding configuration as shown in FIG. 1) near bottom edge 112 behind rear edge 108. Rear wheel 116 is configured to slide out from or retract inside of outer casing 102 in the folded configuration via a sliding mechanism, as described further below. Such motion transitions the rear wheel 116 between a stored state and a deployed state, as discussed further, below.

Electric scooter 100 includes a top surface 118 disposed between first side surface 104 and the opposite second side surface. In an example embodiment, top surface 118 includes an opening 120 extending substantially along the length of electric scooter 100. (i.e., from front edge 106 to rear edge 108). In one embodiment, opening 120 is disposed spaced from front edge 106 of electric scooter 100 and extends all the way to rear edge 108. For example, as shown in FIG. 1, opening 120 extends along top surface 118 from a first end 122 to a second end 124 located at rear edge 108. In this embodiment, first end 122 of opening 120 is spaced from front edge 106 by a distance (D) so that opening 120 is offset on top surface 118.

In some embodiments, opening 120 extends to rear edge 108 along top surface 118 and partially extends down rear edge 108. In this embodiment, opening 120 is in the form of a slot disposed between first side surface 104 and the opposite second side surface. Such a slot is present to allow the retraction and extension of elements that protrude from the exterior of outer casing 102 of electric scooter 100 during the folding and unfolding, as discussed further below. In particular, the opening 120 allows for the retraction and extension of the steering assembly 128.

In some embodiments, electric scooter 100 includes components configured to allow a user to ride electric scooter 100 in the unfolded configuration. For example, in this embodiment, electric scooter 100 includes a seat 126 and a steering assembly 128. While seat 126 is shown as being cylindrical, seat 126 may take on a number of forms and shapes in various embodiments. In one embodiment, seat 126 is configured to mount to a seat pole 132 that is attached internally to the inside of electric scooter 100 (e.g., inside outer casing 102). In FIG. 1, steering assembly 128 is configured to control orientation of front wheel 114 to allow a user to steer electric scooter 100 when in the unfolded configuration. In an example embodiment, steering assembly 128 includes a handlebar 130 that is configured to receive hands of a user to steer front wheel 114.

It is to be understood that a personal transport device (such as an electric scooter 100) according to the embodiments described herein may include additional components not shown or described. For example, a personal transport device in the form of an electric scooter (e.g., electric scooter 100) may include components such as a battery, throttle and brake controls, etc. that allow a user to ride the electric scooter. Other embodiments of personal transport devices may also include additional or different components without departing from the techniques of the present embodiments described in the present disclosure.

Additionally, the discussion of embodiments as presented focuses on the use of a latching mechanism aiding in the extension and retraction of the rear wheel 116. Such a latching mechanism holds the rear wheel 116 firmly in place when the rear wheel 116 is extended or retracted. An electric scooter 100 may include additional elements, used for riding the electric scooter 100 such as pedals, footrests, or a kickstand that are not directly germane to the retraction and extension of the rear wheel 116 and hence are not shown here.

Referring now to FIG. 2, a side view showing the internal components of a compact personal transport device in the form of electric scooter 100 is shown. In this view, outer casing 102 of electric scooter 100 is not shown in cross-section. Instead, the internal components of electric scooter 100 are visible. In an example embodiment, electric scooter 100 includes a rear wheel 116 which is shown in an extended state 216. The rear wheel 116 may change state between an extended state 216 and a retracted state 212. The rear wheel 116 may also be covered by a fender 170 that protects a top surface of the rear wheel 116 as the rear wheel 116 rolls during the operation of the electric scooter 100.

The electric scooter 100 includes a frame 200 that include a lower part with a sliding mechanism for the rear wheel. The frame 200 also includes a front angled arm 201 attached to a front of the lower part, and a rear angled arm 202 attached to a rear of the lower part. The rear wheel 116 is connected to an arm 214 that extends from an inner extrusion 206, surrounded by an outer extrusion 208. The inner extrusion 206 and the outer extrusion 208 together form the lower part of the frame of the electric scooter 100. The front angled arm 201 supports the steering assembly 128. The rear angled arm 202 supports and connects the seat post 132 to the lower part of the frame when the arm 214 is in the extended state.

At the interface between arm 214 and the base of seat post 132 is a rear wheel pin 204, located at the back of electric scooter 100. When extending the rear wheel 116, a handle 222 attached to the rear wheel pin 204 is lifted, which releases the rear wheel pin 204. The rear wheel pin 204 is to be lifted to allow an extended rear wheel 116 to retract. Further, the rear wheel pin 204 may optionally be lifted to allow an extended rear wheel 116 to extend. In one embodiment, the rear wheel pin 204 may be spring-loaded so that it can only return to its original form when the rear wheel 116 is fully extended (in state 216) or fully retracted (in state 212).

FIG. 2 shows a cam-latch mechanism 210. Additional details of the cam-latch mechanism 210 are provided, in particular, in FIG. 4A and FIG. 4B. In general, a cam lever 250 locks and unlocks the cam-latch mechanism 210. Such locking and unlocking occurs by rotating the cam lever 250. Rotating the cam lever 250 moves a cam to lock and unlock the cam-latch mechanism. Once the cam lever 250 unlocks the cam-latch mechanism 210, the inner extrusion 206 is able to slide horizontally in and out within the outer extrusion 208 along with the arm 214. As the arm 214 slides, its attached rear wheel 116 slides in and out of the outer casing 102 of the electric scooter 100 accordingly.

FIG. 3A is a side view showing internal components of the compact personal transport device of FIG. 1, in a configuration with a retracted and locked rear wheel, in accordance with aspects of the present disclosure. FIG. 3A helps clarify the differences between the configuration with the retracted and locked rear wheel and the extended and locked rear wheel configuration as shown in FIG. 2. For example, FIG. 3A separately shows the retracted and locked rear wheel 116, and shows outer extrusion 208 surrounding inner extrusion 206. In FIG. 3A, inner extrusion 206 is fully retracted into outer extrusion 208 and cam-latch mechanism 210 locks a rear portion of the inner extrusion 206 into place with a rear portion of the outer extrusion 208. Accordingly, the rear wheel 212 and the associated arm 214 are locked into place beneath rear angled arm 202. While not shown in FIG. 3A, when the rear wheel 118 is retracted, the rear wheel 118 and the associated arm 214 are located within the confines of outer casing 102.

FIG. 3A also shows handle 22 beneath a bottom of seat post 132. Because the rear wheel 116 is retracted, the rear wheel pin 204 is not engaged with a rear wheel pin receptacle 310 (shown in FIG. 3B. However, because of the locking that occurs using the cam-latch mechanism 210, rear wheel 116 is locked in place into the retracted state 212 as shown in FIG. 3A. Accordingly, it is possible to transport the electric scooter 100 while remaining assured that rear wheel 116 will stay locked in place and not suddenly or accidently detach and slide out in an inconvenient manner. FIG. 3B is a side view showing internal components of the compact personal transport device of FIG. 1, in a configuration with an extended and locked rear wheel, in accordance with aspects of the present disclosure. FIG. 3B helps clarify the structure of rear wheel 116 as shown in FIG. 3A by separately showing the rear wheel 116 in the extended state 216. FIG. 3B shows a scenario in which the arm 214 and the inner extrusion 206 have slid to the rear of the electric scooter 100. The weight of outer extrusion 208 rests in its front on front wheel 114. The weight of outer extrusion 208 rests in its back on the front end of inner extrusion 206.

Moreover, the connection between the rear portion of outer extrusion 208 is anchored and locked in place with the front portion of inner extrusion 206 by the cam-latch mechanism 210. FIG. 3B shows when the inner extrusion 206 and the arm 214 extend from the cam-latch mechanism 210, they also extend beneath seat post 132.

When the inner extrusion 206 is extended, it is anchored at one end by the locked connection between outer extrusion 208 and inner extrusion 206 by the cam-latch mechanism 210. It is also anchored in place by a rear wheel pin 204 that extends into a pin receptacle 310 at a top portion of a rear portion of the inner extrusion 206. Immediately behind the rear wheel pin 204 and the pin receptable 310, arm 214 connects rear wheel 218 to the rear of the inner extrusion 206.

Figure 4A:
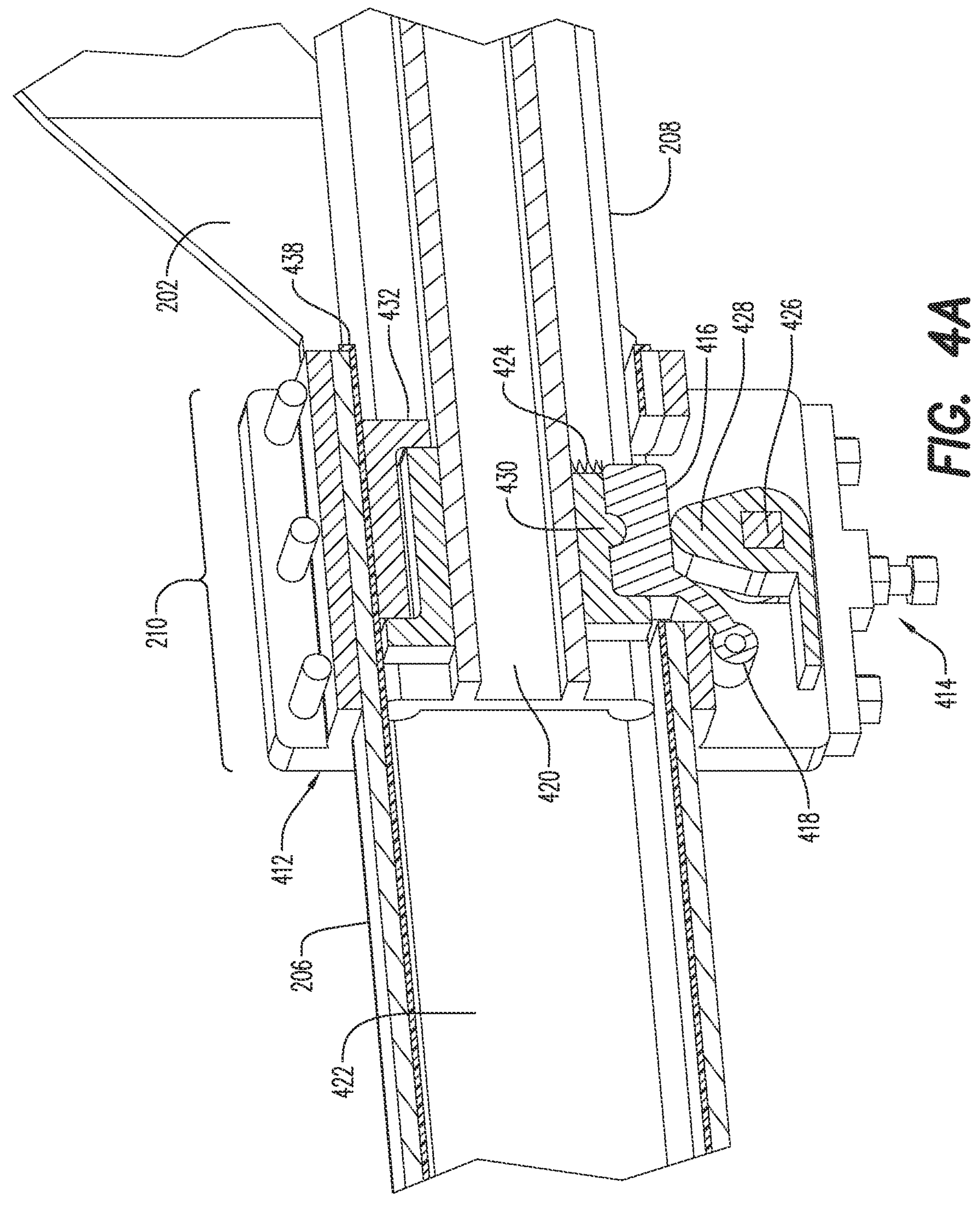
FIG. 4A is a side view showing details of a cam-latch mechanism used to lock the rear wheel in a stored or deployed state included in the compact personal transport device of FIG. 1, in accordance with aspects of the present disclosure.
Figure 4B:
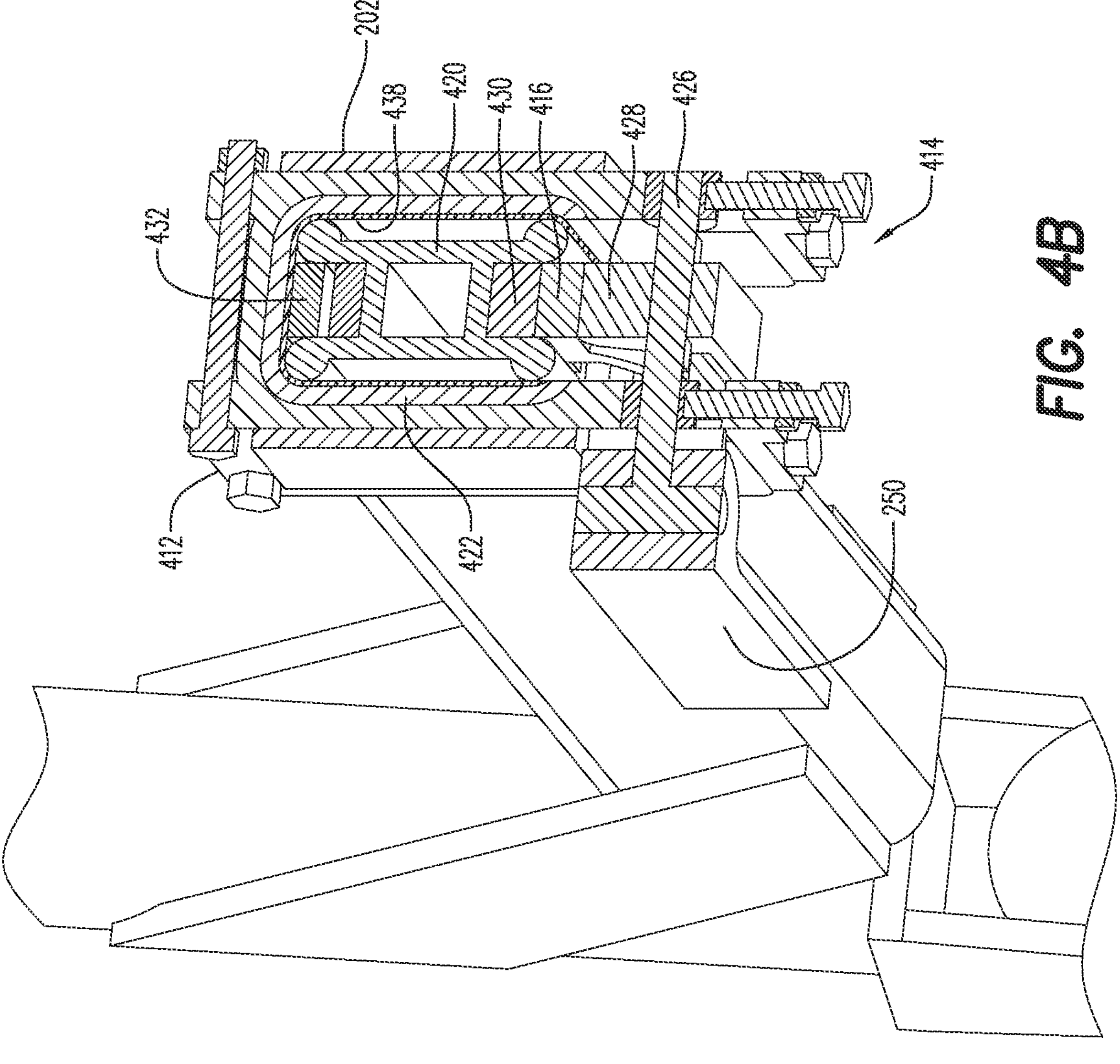
FIG. 4B is a cutaway view showing details of a cam-latch mechanism used to lock the rear wheel in a stored or deployed state included in the compact personal transport device of FIG. 1, in accordance with aspects of the present disclosure.

FIG. 4A is a side view showing details of a cam-latch mechanism 210 used to lock the rear wheel 218 in a retracted or extended state included in the compact personal transport device of FIG. 1, in accordance with aspects of the present disclosure. FIG. 4B is a cutaway view showing details of a cam-latch mechanism, 210 used to lock the rear wheel showing details of a cam-latch mechanism 210 used to lock the rear wheel in a retracted or extended state included in the compact personal transport device of FIG. 1, in accordance without aspects of the present disclosure. FIG. 4B helps show the three-dimensional relationships between elements shown from a side view in FIG. 4A As shown in FIGS. 4A and 4B, the cam-latch mechanism 210 includes an extrusion clamp block 412 which clamps the cam latch 210 onto an outer portion of the outer extrusion 208. In the structure of the cam-latch mechanism 210 that is on the lower side, there is a mechanism for locking and releasing a clamping mechanism. Specifically, the mechanism for locking and releasing the clamping mechanism includes a safety spring 418, a cam 428, and a cam shaft 426. The mechanism also includes a cam shaft adjusting bolt and nuts 414. These elements may be attached to a cam lever 250, as shown in FIG. 4B. Rotating the cam lever 250 may position the cam 428 to lock and unlock the cam-latch mechanism 210. In the illustrated embodiment, the clamping mechanism is shown as being located on a lower part of the cam-latch mechanism 210, but in other embodiments the clamping mechanism may be located on an upper part of the cam-latch mechanism 210.

The extrusion clamp block 412 also surrounds an inner tube 420 of inner extrusion 206 and an outer tube 422 of outer extrusion 208. When the inner extrusion 206 is locked place by the cam-latch mechanism 210, there is a wedge block 416 that restricts the further motion of inner tube 420. The wedge block 416 may be found on a lower side of the cam-latch mechanism 210. The wedge block 416 extends between the extrusion clamp block 412 and the outer tube 422 into the inner tube 420. The wedge block 416 rests on a wedge block shim 430 of the inner tube 420. Thus, as the cam-latch mechanism 210 allows the inner tube 420 to slide back and forth within the outer tube 422, the wedge block 416 slides along until the wedge block shim 430. There may also be a wedge block rebound spring 424 that controls the motion of the wedge block 416 to rest on or be lifted off the wedge block shim 430.

Between the extrusion clamp block 412 and the inner tube 420, there also may include an extension position stopper 432. The extension position stopper 432 may ensure that, when the arm 214 is fully extended, a stopper shim 434 of the inner extrusion 206 may engage with the extension position stopper 432, so that the inner extrusion 206 does not slide any further back. In the illustrated embodiment, the extension position stopper 432 is shown as being located on the upper part of the cam-latch mechanism 210, but in other embodiments the extension position stopper 432 may be located on the lower part of the cam-latch mechanism.

When the mechanism is locked, the cam lever 250 is parallel to the arm. Thus, the latching mechanism operates based on a sequence of manipulations as the wheel is unlocked, and then slid forward or backward. As noted, the operation of the pin is also a part of how the arm 214 locks and unlocks to allow a transition between the rear wheel 116 being in an extended state or being in a retracted state. For example, the cam lever 250 is turned and/or rotated. By moving the cam lever 250 in this manner, the cam 428 is engaged or disengaged. When the cam 428 is engaged or disengaged, the cam-latch mechanism 210 is positioned in a way that allows the inner tube 420 to move along outer tube 422. In one embodiment, when the cam lever 250 is turned and/or rotated, the cam 428 is disengaged, the wedge block rebound spring 424 lifts wedge block 416 from wedge block shim 430, and the inner tube 420 is allowed to move along outer tube 422. As the outer tube 422 of the cam-latch mechanism 210 receives the inner tube 420, another wedge block shim 430 at the other end of the inner tube 420 approaches the wedge block 416.

Once the inner tube 420 is fully retracted into the outer tube 422, the wedge block 416 again rests on another wedge block shim 430, located at the rear end of the inner tube 420. At this point the inner tube 420, and the rear wheel 116 along with it, has been retracted into the interior of the outer tube 420. Accordingly, it is necessary to reverse the locking process. To do so, the cam 428 is locked using the cam lever 250, and the cam-latch mechanism 210 locks the cam 428 in place.

Figure 5:
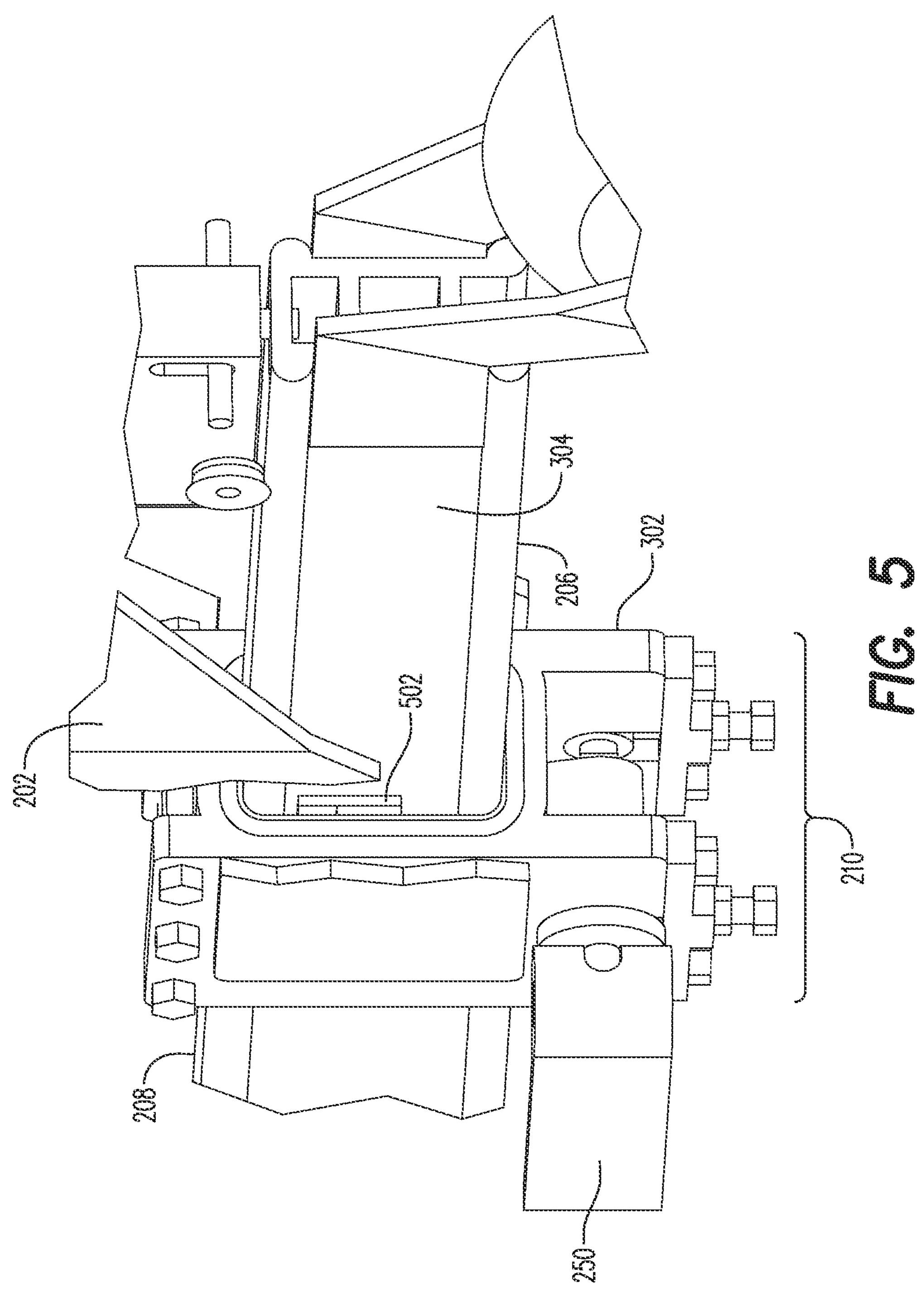
FIG. 5 is a side view showing the use of a Hall sensor in conjunction with a cam-latch mechanism in which the rear wheel slides back and forth, in accordance with aspects of the present disclosure.

FIG. 5 is a side view showing the use of a Hall sensor in conjunction with a mechanism in which the rear wheel slides back and forth, in accordance with aspects of the present disclosure. FIG. 5 shows an embodiment in which an arm 304 extends, with a rear wheel at its end in the extended state. Angled rear arm 202 extends upwards, into the electric scooter 100, and the clamping mechanism 302 holds arm 304 in the extended state. For example, clamping mechanism 302 may include a cam-latch mechanism 210, which may also include a cam lever 250 to lock and unlock the cam-latch mechanism 210. While FIG. 5 shows an embodiment in which arm 304 is in the extended state, it will be recognized that FIG. 5 could be readily adapted to the retracted state, in that arm 304 may be fully retracted into the outer extrusion 208, and thus the rear wheel will be locked into a position adjacent to the clamping mechanism 302. Clamping mechanism 302 may also include a rear wheel pin 204, as discussed above.

Either integrated into the clamping mechanism 302, or attached proximate to the clamping mechanism 302 may be a Hall sensor 502. Such a Hall sensor 502 may use the Hall effect to detect whether the arm 304 is retracted or extended. The determination is important because it should be possible to activate the electric scooter 100 when the arm 304 is fully extended. If the arm 304 is retracted, or only partially extended, the electric scooter 100 will not turn on. Thus, the Hall sensor 502 detects an element at the front end of arm 304. Only when such an element is aligned with the Hall sensor 502 is the electric scooter 100 able to turn on.

Should the element not be aligned with the Hall sensor 502, this is interpreted as a sign that the arm 304 is either partially or fully retracted. In such a situation, the rear wheel would not be anchored by the clamping mechanism 302. In particular, the rear wheel would only be anchored by the clamping mechanism 302 when the arm 304 is fully extended. Accordingly, this provides for a situation in which the rear wheel is in a state suitable for actively using the electric scooter 100. Moreover, if the arm 304 is fully extended, it indicates that the rear wheel is anchored by the clamping mechanism 302 and the pin mechanism is engaged. Therefore, in such a situation, the Hall sensor 502 indicates that the arm 304 and associated rear wheel are positioned in a way that indicates that the electric scooter 100 is ready to be driven. FIG. 6 is an angled side view showing three-dimensional aspects of the compact personal transport device of FIG. 1, in a configuration with an extended rear wheel, in accordance with aspects of the present disclosure. FIG. 6 shows aspects of the three-dimensional structure of an electric scooter 100 without the outer casing 102. For example, FIG. 6 shows interior components of the electric scooter 100 using a view from behind and to the left. The electric scooter 100 includes a front wheel 114 and a rear wheel 116. The front wheel 114 will remain static.

However, as discussed above, rear wheel 116 retracts and extends between a retracted state and an extended state. The retracted state is a state in which the rear wheel 116 is almost entirely or entirely retracted into the outer casing 102. In such a situation, it may be easier to carry the electric scooter 100. It is awkward to carry the electric scooter 100 with a fully or partially extended rear wheel 116, in that rear wheel 116 will protrude from outer casing 102 in a way that is inconvenient when carrying the electric scooter 100. The rear wheel 116 may also be covered by a fender 170.

FIG. 6 also shows a bottom portion of a steering assembly 128. The steering assembly 128 is attached to an outer extrusion 208, from which an inner extrusion 206 extends. These extrusions are locked together by clamping mechanism 302. The clamping mechanism 302 may include a cam-latch mechanism that includes a cam lever 250. The rear wheel 116 is joined to inner extrusion 206 using an arm 214 and the clamping mechanism 302 also includes a rear wheel pin 204, such as discussed in FIG. 2, FIG. 3A, and FIG. 3B.

Figure 7:
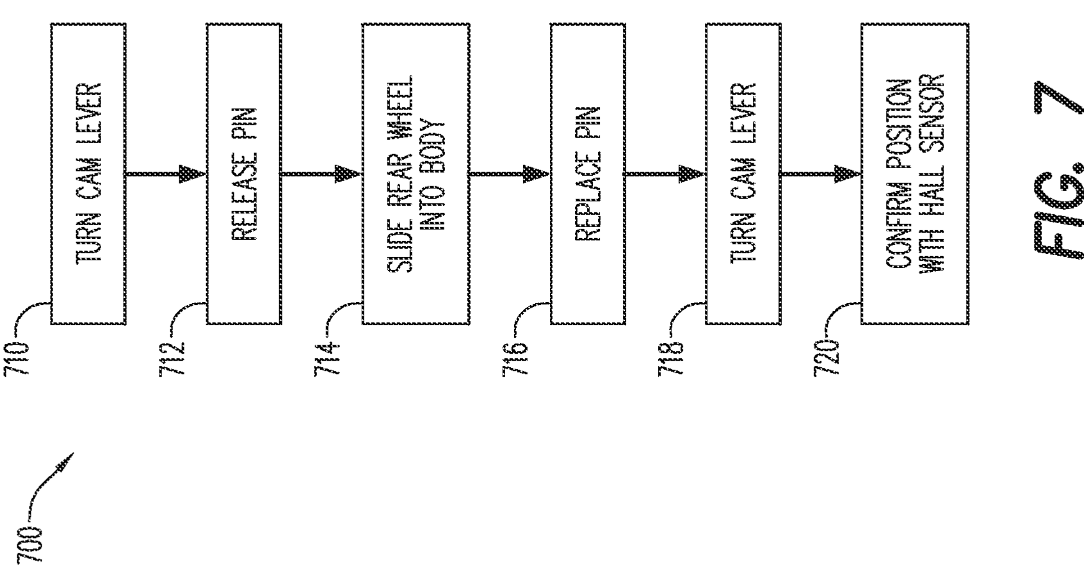
FIG. 7 is a flowchart showing steps included in a method of retracting a rear wheel into a compact personal transport device into a stored state, in accordance with aspects of the present disclosure.

FIG. 7 is a flowchart showing steps included in a method of retracting a rear wheel into a compact personal transport device 700, in accordance with aspects of the present disclosure. In step 710, the method turns the cam lever. For example, turning the cam lever 250 releases the cam 428 so the inner extrusion 206 can slide inside the outer extrusion 208. Examples of such sliding are shown in FIG. 2, FIG. 3A, and FIG. 3B, and at other points in the drawings. For example, these figures illustrate inner extrusion 206 and outer extrusion 208. However, the inner extrusion 206 may still be secured by a pin. In step 712, the method releases the pin. For example, the pin may be rear wheel pin 204, and may be released using handle 222. However, given the positioning of the rear wheel pin 204 in some embodiments, this step may be optional.

In step 714, the method slides the rear wheel into the body of the compact personal transport device 700. For example, rear wheel 116 may slide into the body of electric scooter 100. In step 716, the method replaces the pin, if needed. For example, the rear wheel pin 204 may be spring loaded, and may snap into place accordingly. In step 718, the method turns the cam lever. For example, the cam lever 250 rotates and relocks a corresponding cam 428. Finally, in step 720, the method confirms the position of the wheel with a Hall sensor. For example, the Hall sensor 502 may perform this task as shown in FIG. 5. Once the Hall sensor 502 detects that the rear wheel 116 is in a retracted state 212, the compact personal transport device 700 is not able to activate.

Figure 8:
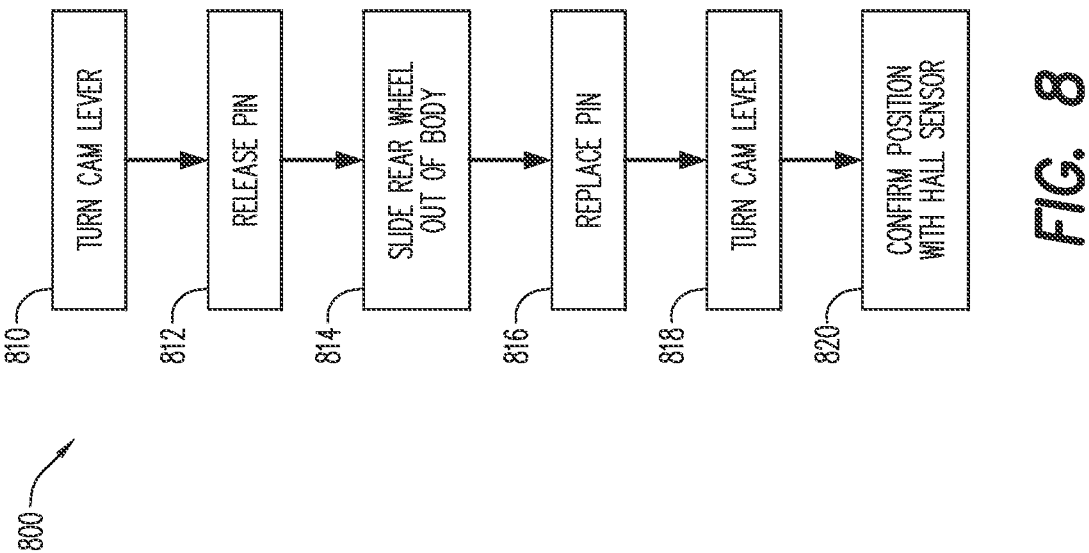
FIG. 8 is a flowchart showing steps included in a method of extending a rear wheel from a compact personal transport device into a deployed state, in accordance with aspects of the present disclosure.

FIG. 8 is a flowchart showing steps included in a method of extending a rear wheel from a compact personal transport device 800, in accordance with aspects of the present disclosure. In step 810, the method turns the cam lever. As discussed above, turning cam lever 250 releases the cam 428 so that the inner extrusion 206 can slide out of the outer extrusion 208. In step 812, the method releases a pin. For example, the pin may be rear wheel pin 204, and may be released using handle 222. However, given the positioning of the rear wheel pin 204 in some embodiments, this step may be optional.

In step 814, the method slides the rear wheel out of the body of the compact personal transport device 800. In step 816, the method replaces the pin, if needed. For example, the rear wheel pin 204 may be spring loaded, and may snap into place accordingly. In step 818, the method turns the cam lever. For example, the cam lever 250 rotates and relocks a corresponding cam 428. Finally, in step 820, the method confirms the position of the wheel with a Hall sensor, such as Hall sensor 502 of FIG. 5. Once the Hall sensor 502 detects that the rear wheel (e.g., rear wheel 116) is in an extended state, the compact personal transport device 800 is able to activate. It would then be safe to provide power to the compact personal transport device 800 because the rear wheel is in the extended and locked state.

By using the rear wheel latching mechanism of the example embodiments, rear wheel 116 is extended and retracted in a convenient and safe manner. Such an approach makes it simpler to move a rear wheel easily and safely 116 between a retracted state 212 and an extended state 216. In each state, the rear wheel 116 is stable, in that it is secured by a cam-latch mechanism and potentially a pin as well. However, should the user desire to change a position of the rear wheel 116, it is easy to unlatch the cam-latch mechanism and release the pin, allowing the rear wheel 116 to change position. With this arrangement, electric scooter 100 may be a convenient personal transport device for a user to travel for "last-mile" or "first-mile" trips to a destination in the deployed state and can be quickly converted to the stored configuration to allow the user to carry or transport once they reach their destination. Additionally, having a cam-latch mechanism as described is useful, in that the rear wheel 116 and its latching may be managed in a simple, unified way rather than requiring potentially unsafe or unreliable alternative latching approaches, which may be clumsy, awkward, and inconvenience by comparison to the approaches presented herein.

While various embodiments of the disclosure have been described, the description is intended to be exemplary, rather than limiting and it will be apparent to those of ordinary skill in the art that many more embodiments and implementations are possible that are within the scope of the disclosure. According, the disclosure is not to be restricted except in light of the attached claims and their equivalents. Also, various modification and changes may be made within the scope of the attached claims.

The invention claimed is:

1. A rear wheel latching mechanism for a personal transport device comprising:

a rear wheel attached to an arm, the arm comprising an inner extrusion that slides on one axis of a fixed frame of the personal transport device in a horizontal direction;

wherein the fixed frame comprises an outer extrusion that surrounds the inner extrusion;

a rear wheel cam-latch, configured to lock the inner extrusion and the outer extrusion together;

wherein the rear wheel cam-latch allows the rear wheel to articulate when the rear wheel cam-latch is unlatched between a stored state and a deployed state; and a rear wheel pin that catches and holds the rear wheel in the deployed state to fix a front portion of the inner extrusion and a rear portion of the outer extrusion before the rear wheel cam-latch clamps the inner and outer extrusions together.

2. The mechanism of claim 1, wherein the rear wheel cam-latch is located on a bottom side of the outer extrusion.

3. The mechanism of claim 1, further comprising a Hall sensor attached to the rear wheel cam-latch configured to determine whether the rear wheel is in the stored state or in the deployed state.

4. The mechanism of claim 1, wherein the rear wheel cam-latch includes a wedge block that slides along the inner extrusion.

5. The mechanism of claim 1, further comprising a cam lever that is rotated to release a cam in the rear wheel cam-latch so that the rear wheel can articulate into and out of the body of the personal transport device.

6. The mechanism of claim 5, wherein the cam lever is located on a lower side of the rear wheel cam-latch.

7. The mechanism of claim 1, further comprising a pin handle that is lifted to release the pin.

8. A personal transport device comprising:

a fixed frame, comprising a horizontal lower portion and an angled upper portion;

wherein the horizontal lower portion is attached to a bottom end of the angled upper portion;

a rear wheel attached to an arm that slides along the horizontal lower portion of the fixed frame of the personal transport device;

a rear wheel cam-latch, configured to lock the arm in place to the horizontal lower portion of the fixed frame of the personal transport device;

wherein the rear wheel cam-latch allows the rear wheel to articulate when unlatched between a stored state and a deployed state; and a rear wheel pin that holds the rear wheel in the deployed state to fix a front part of the arm and a rear part of the horizontal lower portion of the fixed frame before the rear wheel cam-latch clamps the arm in place.

9. The personal transport device of claim 8, further comprising a cam lever that is rotated to release a cam in the rear wheel cam-latch so that the rear wheel can articulate into and out of the body of the personal transport device.

10. The personal transport device of claim 9, wherein the cam lever is parallel to the arm when in a locked state and is perpendicular to the arm when in an unlocked state.

11. The personal transport device of claim 9, wherein the rear wheel cam-latch comprises at least one cam shaft adjusting bolt and at least one cam shaft adjusting nut connecting the cam lever to the cam.

12. The personal transport device of claim 8, further comprising a front wheel attached to a front portion of the horizontal lower portion of the fixed frame.

13. The personal transport device of claim 8, further comprising a seat pole connecting a rear portion of the horizontal lower portion of the fixed frame to a seat extending from above an upper portion of the angled upper portion of the fixed frame.

14. The personal transport device of claim 13, further comprising a pin handle connected to the seat pole and extending from a rear portion of the horizontal lower portion that is lifted to release the rear wheel pin.

15. A personal transport device comprising:

a fixed frame, comprising a horizontal lower portion and an angled upper portion;

a rear wheel attached to an arm comprising an inner tube that slides along the horizontal lower portion of the fixed frame of the personal transport device;

wherein the inner tube is surrounded by an outer tube integrated into the fixed frame;

a rear wheel cam-latch, configured to lock the inner tube and the outer tube together;

wherein the rear wheel cam-latch allows the rear wheel to articulate when unlatched between a stored state and a deployed state; and a rear wheel pin that holds the rear wheel in the deployed state to fix a front portion of the inner tube and a rear portion of the outer tube before the rear wheel cam-latch clamps the inner tube and the outer tube together.

16. The personal transport device of claim 15, further comprising an outer casing.

17. The personal transport device of claim 15, further comprising a wedge block, a wedge block shim located between a front portion of the inner tube and the outer tube, and a wedge block shim located between a rear portion of the inner tube and the outer tube.

18. The personal transport device of claim 15, wherein the rear wheel cam-latch includes a lower extension position stopper on a top side of the outer tube.

19. The personal transport device of claim 15, wherein the rear wheel cam-latch includes an extrusion clamp block on a top side of the outer tube.

20. The personal transport device of claim 15, further comprising a polyester shim situated between a front lower end of the outer tube and a front lower end of the inner tube.

* * * * *